Patented May 2, 1950

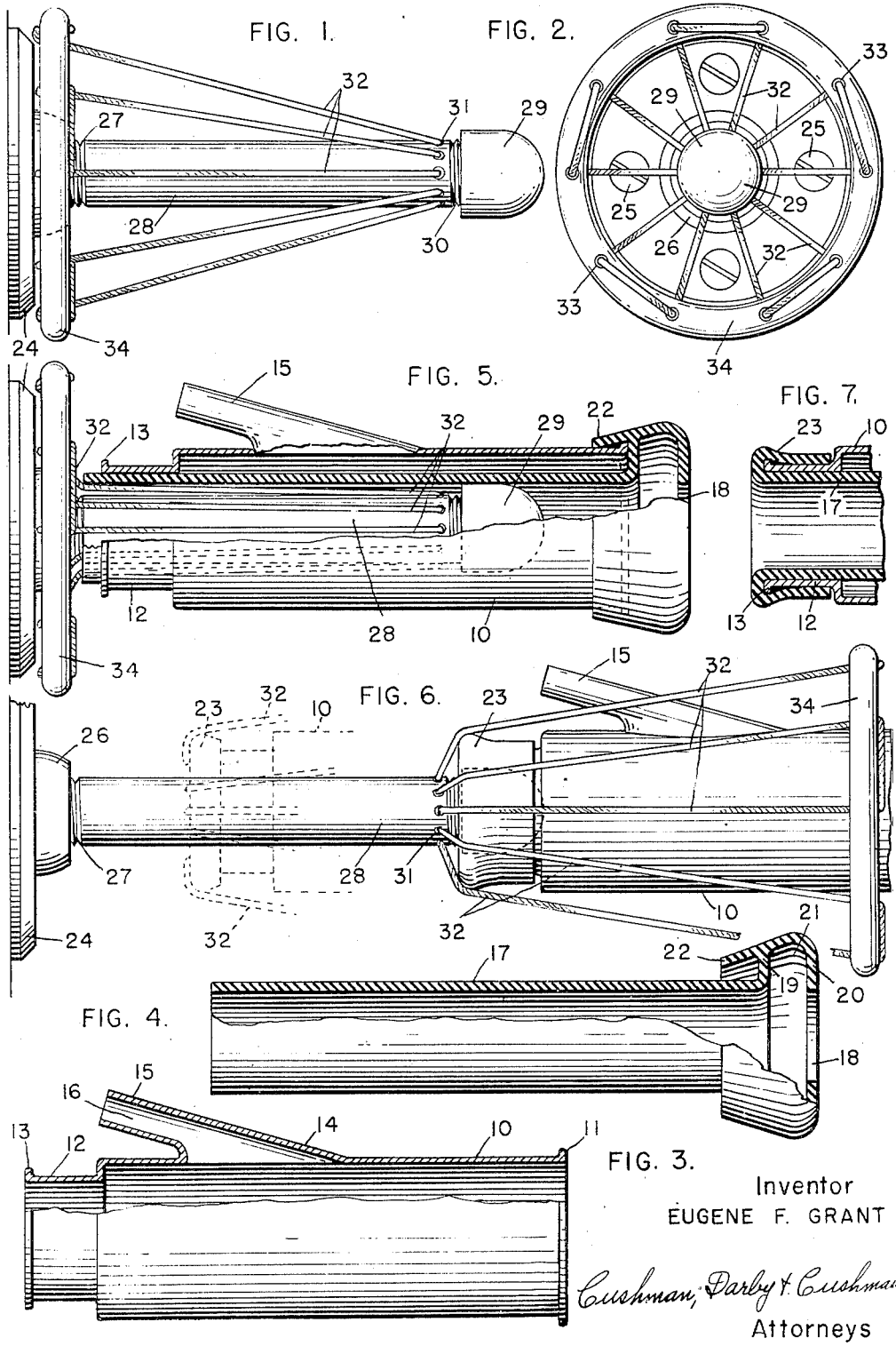

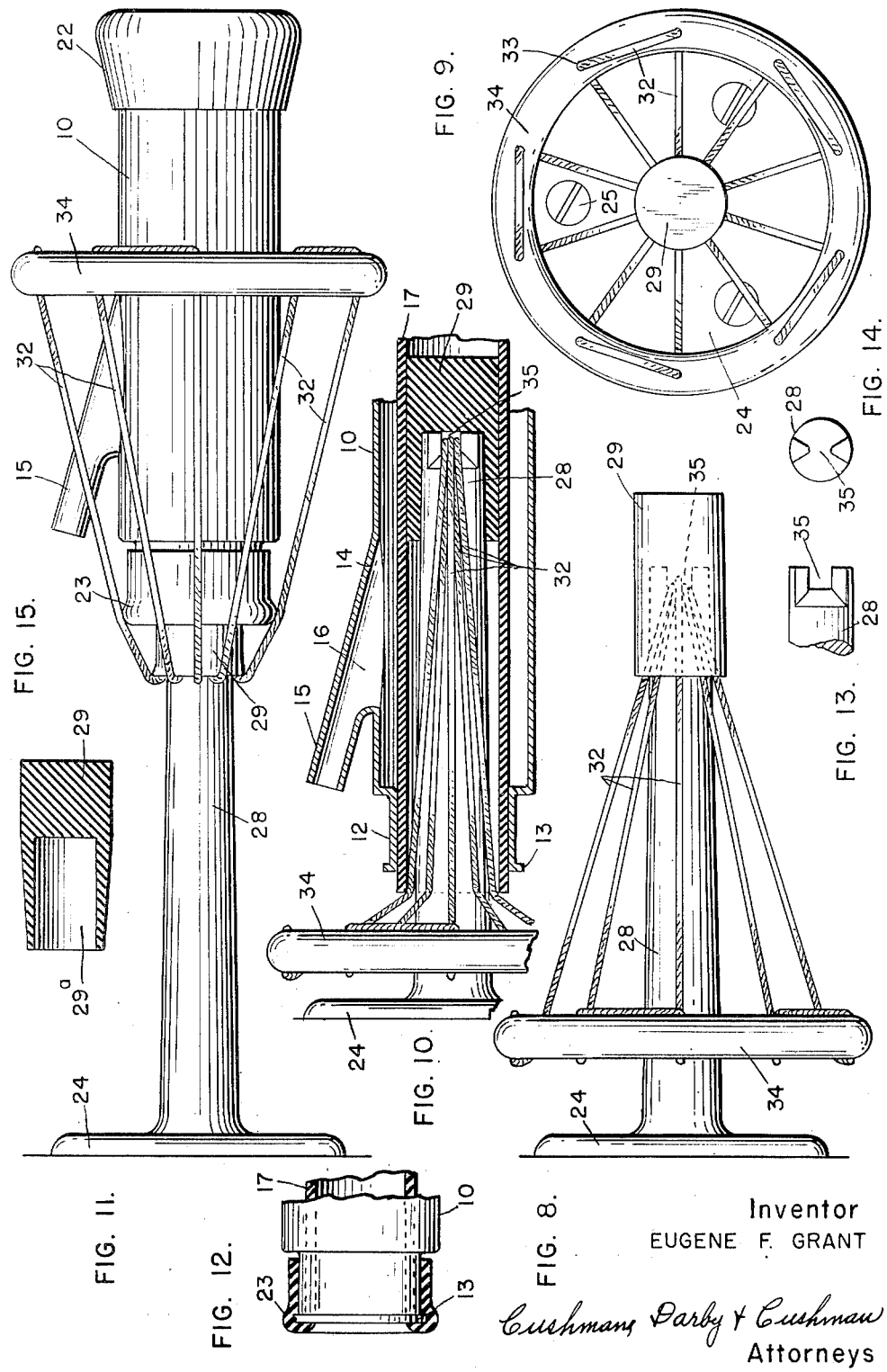

2,506,079

UNITED STATES PATENT OFFICE 2,506,079

TEAT CUP LINER TURNER

Eugene F. Grant, Fredericktown, Ohio

Application August 21, 1947, Serial No. 769,982

3 Claims. (Cl. 29—235)

My invention relates to a liner applicator and has for its principal object the provision of a device for applying flexible liners to metal tubes such as the teat cups of a mechanical milking apparatus.

Farmers, dairymen and others familiar with mechanical milking machines will readily appreciate the difficulty and inconvenience heretofore experienced in applying the rubber liners to teat cups such as now widely used and as disclosed, for example, in United States Patent No. 2,323,851 assigned to the De Laval Separator Company. The liner, when properly applied, is stretched or drawn through the end of the metal shell and while under tension is turned over the outer surface at the end of the shell a sufficient distance to prevent it from snapping back into the cup while in use. Proper tension on the part of the liner is essential to the fastest and most efficient job of milking.

In manually applying the liner to the shell, the operator has only a small area at the end of the liner to grasp between his thumb and fingers. Obviously, considerable strength and skill are required to stretch the heavy liner material and while it is thus under tension, turn it the proper distance over the end of the cup. Even those who have had considerable experience find this a difficult feat, especially on wintry mornings when the fingers are cold or if the rubber liner is wet and slippery. The operation often results in broken finger nails, loss of time, and, in fact, rather than suffer this inconvenience, the operator is inclined to shirk the duty of removing the liner after each milking to properly cleanse and sterilize the apparatus.

My liner applicator provides means for overcoming these difficulties and consists of a unitary device which is simple in structure and operation and which may be economically manufactured whereby farmers and dairymen may readily afford them.

In the accompanying drawing forming a part of this application and in which like reference characters are employed to designate like parts throughout the same;

Figure 1 is a side elevation of my liner applicator.

Figure 2 is a top end view of the member as shown in Figure 1.

Figure 3 is a side view partly in section of a teat cup shell.

Figure 4 is a side view partly in section of a teat cup liner.

Figure 5 is a side plan view, partly in section, of my invention with a teat cup and liner in position for the first step in the operation of the applicator.

Figure 6 is a plan view similar to Figure 5, showing the applicator in its operated position and the liner applied to the teat cup shell.

Figure 7 is a sectional side view of the end of a teat cup with a liner applied thereto.

Figure 8 is a side plan view of a modified form of my applicator.

Figure 9 is a top end view of the modification illustrated in Figure 8.

Figure 10 is a sectional side plan view of the modification illustrated in Figure 8 with the teat cup and liner in position for the first step in the operation of the applicator.

Figure 11 is a plan view similar to Figure 6 and illustrates a modified form of base for my applicator.

Figure 12 is a side view, partly in section, of the end of a teat cup with a liner applied thereto.

Figure 13 is a side view of one end of my applicator shank as shown in the modification illustrated in Figure 8.

Figure 14 is a top end view of the shank in Figure 13, and

Figure 15 is a sectional side view of a modified nipple which forms a part of my liner applicator.

In the drawing, wherein for the purpose of illustration is shown a preferred embodiment of my invention, Figure 3 illustrates a teat cup of the type disclosed in the De Laval Patent No. 2,323,851, referred to above and with which my invention has been effectively used. The cup is comprised of a tubular metal shell 10 having a bead 11 at one end, the opposite end being reduced in diameter at 12 and terminating in an outwardly extending flange or bead 13, the purpose of which will hereinafter be made apparent. A projection 14 formed with the shell extends outwardly from the side thereof and terminates in a tubular branch 15 which is adapted to receive a flexible conduit (not shown) leading to the pulsator of the milking machine. The branch 15 and projection 14 are provided with the central bore 16 whereby sub-atmospheric pulsations may be introduced into the interior of the shell in the manner well known in the art.

The liner, as best illustrated in Figure 4, comprises a tubular sleeve 17 which is molded or otherwise formed from relatively heavy rubber and is slightly smaller in circumference than the shell 10, whereby it may be readily inserted in the cup. The flexible liner is provided at one end with a head having a teat engaging opening 18 and consisting of outwardly and inwardly flared walls 19 and 20, respectively, which form an annular groove 21. An extension 22 projecting rearwardly from the wall 19 is adapted to overlie the outer surface of the end of the shell and engages the bead 11 to retain the liner and shell in proper relationship. To complete the assembly of the liner and the shell, the opposite end from the teat engaging head is turned or folded as at 23 a substantial distance over the reduced section 12 of the cup, the flange 13 operating to retain the liner in such extended and folded position as best illustrated in Figures 7 and 8. A nipple end tube (not shown) fits over the fold 23 at the end of the cup to convey the milk to the receiving receptacle of the machine.

The liner or sleeve 17 being only slightly longer than the shell 10, it is necessary to stretch or extend the same longitudinally in order that the end may be folded a sufficient distance over the reduced section 12 of the shell. It is for this purpose of turning the liner over the end of the tube, while simultaneously stretching or extending the same, that my liner applicator has been devised.

My applicator per se is primarily a unitary device consisting of a base 24 which may be in a form of a disc, cast or otherwise formed from metal or any suitable material and is adapted to be securely fastened by screws 25 to a sturdy support such as a work table or the wall of the milk house. A centrally disposed lug or raised portion 26 is formed integral with the base and is provided with a central opening which is threaded to receive the threaded end 27 of the tubular shaft 28. While I have shown a threaded connection between the shank and the base member, it will be understood that such elements may be welded or otherwise securely joined. In the modification illustrated in Figures 8, 10 and 11, I have shown the base 24 and shaft 28 cast as an integral unit.

Disposed at the opposite end of the shank from the base member is a ball shaped nipple 29 which is slightly larger than the inner bore of the liner 17 and is preferably formed of hard rubber or other composition providing a good gripping surface for engagement with the interior of the rubber liner within which it is adapted to be inserted. The nipple 29 is illustrated in my drawing as secured to the end of the shank by means of the threads 30. Although this has proven to be an effective means for securing the nipple to the shank, other devices may be employed such as vulcanizing the rubber to the shaft or providing out-turned prongs which may be stuck in the surface of the shaft, the principal object being to secure the same firmly so that it will not become loosened by the relatively high pressure or tension to which it is repeatedly subjected while in use.

In the modification illustrated in Figures 8, 10 and 15, I have shown the nipple 29 as cylindrical with side walls which taper inwardly from adjacent one end. The nipple is provided with a central bore 29a within which the end of the shaft 28 is inserted. In the use of this modified form of nipple, particularly when the threads 30 have been omitted from the end of the shaft as shown in Figures 10 and 11, it has been found advisable to use rubber cement or other adhesive to secure the nipple to the shaft.

Referring to Figures 1 and 6, a plurality of holes 31 are drilled or otherwise provided in spaced annular relation about the end of the shank 28 adjacent the nipple 29 and are adapted to receive a flexible strand 32 which may be heavy cotton cord, nylon, wire, rawhide or other tough wear-resistant, pliable material. The material may be in one length or may consist of a plurality of relatively short lengths. In either event, the strand or strands are formed into a plurality of loops which are laced through the holes 31 and through correspondingly spaced apertures 33 drilled annularly about the ring 34 as particularly illustrated in Figure 2. The ring 34, preferably of metal and other non-deformable material, surrounds the shank 28 and is carried for longitudinal movement with respect to the shank. In circumference, the ring is sufficiently large to enable it to travel freely over the shell of the teat cup during the operation of the device as will later be made apparent. It will be noted that in the at-rest position, as illustrated in Figure 1, the loops of the strand are sufficiently long to permit the ring to lie adjacent the base 24.

In the modification shown in Figures 8, 10, 13 and 14, the holes 31 near the end of the shank 22 are dispensed with and the extreme tip of the shaft is notched at 35 to receive the loops of the flexible strand 32. In this form it has been found particularly desirable to use a single relatively long strand and lace the same through the apertures 33 in the ring 34. By using a single strand to form the loops, only one knot or connection for the ends is necessary. This eliminates the bulkiness of a number of knots where a plurality of short strands are used to form the loops. The loops of the strand, including the joining knot or tie are placed in the notch 35 and upon the end of the shaft being inserted within the bore 29a of the nipple 29, the loops and assembly are retained in proper position.

In operation, the liner 17 is first inserted completely into the tube 10 in the position whereby the extension 22 of the teat engaging head overlies the bead 11 at the end of the shell. The nipple 29 of the adapter is next inserted in the opposite end of the liner and the liner and shell together are forced along the shank 28 to the position as illustrated in Figures 5 and 10 wherein the end of the shell and liner are in close proximity to the base 24 and ring 34. As the nipple and shank are moved into the liner, the loops of the strand 32 are also carried into the liner until the loops adjacent the ring become taut and further movement into the liner is prevented. When thus assembled, the operator next grasps the ring and by exerting a pull thereon moves the same longitudinally outward over the assembled shell, liner and shank. As the ring is advanced, the nipple which is in engagement with the interior of the liner stretches or draws the liner outwardly to extend the end thereof beyond the end of the shell. Simultaneously with the extension of the liner, the loops of the strand which have assumed the position illustrated in Figures 6 and 10, turn the end of the liner over the end of the shell. The operator continues the application of pressure or pull on the ring until the end of the liner is extended and turned a substantial distance over the reduced section 12 of the shell, whereupon the elasticity of the liner acting upon the flange 13 will retain the liner in such assembled position. The operator may then release the ring and remove the completely assembled cup by withdrawing it the balance of the distance along the shank. The operation of the device is extremely simple and requires no experience or skill.

It will be seen from the foregoing description and drawing that my machine provides a simple and practical device which is inexpensive to manufacture and which is well adapted to carry out the objectives as specified. It will also be obvious that while I have herein described a preferred embodiment of my invention, the same may be altered in detail and arrangement of parts within the scope of the appended claims.

I claim:

1. A device for applying rubber liners to teat cup shells comprising a shank member, a gripping means carried at one end of said shank and of a diameter larger than said shank member to frictionally engage said liner, and a ring member having a diameter larger than that of said shell surrounding said shank and longitudinally movable with respect to said shank, and a plurality of flexible strands secured at the outer extremities to said ring and secured at their inner extremities to said shank member adjacent said liner gripping means.

2. A device for applying rubber liners to teat cup shells comprising a shank member, a gripping means carried at one end of said shank and of a diameter larger than said shank member to frictionally engage said liner, a ring member having a diameter larger than that of said shell surrounding said shank and longitudinally movable with respect to said shank, and a plurality of loops formed of a single flexible strand secured at their outer extremities to said ring in overlapping spaced relationship and secured at their inner extremities to said shank member adjacent said liner gripping means.

3. A device for applying rubber liners to teat cup shells comprising a shank member, a gripping means carried at one end of said shank and of a diameter larger than said shank to frictionally engage said liner, mounting means secured at the opposite end of said shank, a ring member having a diameter larger than that of said shell surrounding said shank, and longitudinally movable with respect to said shank, and a plurality of flexible strands secured at the outer extremities to said ring and secured at their inner extremities to said shank member adjacent said liner gripping means.

EUGENE F. GRANT.

REFERENCES CITED

The following references are of record in the file of this patent:

UNITED STATES PATENTS

| Number | Name | Date |
| --- | --- | --- |
| 1,648,436 | Allen | Nov. 8, 1927 |
| 1,793,454 | Bengtson | Feb. 24, 1931 |
| 2,097,372 | Ho et al. | Oct. 26, 1937 |